(12) United States Patent  
Kuzmarskis et al.

(10) Patent No.: US 9,045,201 B1
(45) Date of Patent: Jun. 2, 2015

(54) CORK WATERSPORTS BOARD

(71) Applicants: Tadas Kuzmarskis, Bristol (GB); Pieter Daniel Kalkman, Bristol (GB)

(72) Inventors: Tadas Kuzmarskis, Bristol (GB); Pieter Daniel Kalkman, Bristol (GB)

(*) Notice: Subject to any disclaimer, the term of this patent is extended or adjusted under 35 U.S.C. 154(b) by 0 days.

(21) Appl. No.: 13/754,794

(22) Filed: Jan. 30, 2013

(51) Int. Cl.
*B63B 35/79* (2006.01)
*B32B 21/00* (2006.01)
*B32B 37/10* (2006.01)
*B32B 38/00* (2006.01)

(52) U.S. Cl.
CPC ............ *B63B 35/7906* (2013.01); *B32B 21/00* (2013.01); *B32B 37/1009* (2013.01); *B32B 38/0004* (2013.01)

(58) Field of Classification Search
CPC  B63B 35/79; B63B 35/7906; B63B 35/7909; B63B 35/7916; B63B 21/00; B63B 37/1009; B63B 38/0004
USPC ...................................................... 441/65, 74
See application file for complete search history.

(56) References Cited

U.S. PATENT DOCUMENTS

| | | | | |
|---|---|---|---|---|
| 1,402,529 A | * | 1/1922 | Royal | 441/74 |
| 1,867,507 A | * | 7/1932 | Harris | 441/74 |
| 5,033,497 A | * | 7/1991 | Hernandez | 135/95 |
| 5,145,430 A | * | 9/1992 | Keys et al. | 441/74 |
| 5,489,228 A | * | 2/1996 | Richardson et al. | 441/74 |
| 5,514,017 A | * | 5/1996 | Chimiak | 441/65 |
| 5,816,876 A | * | 10/1998 | Hamilton | 441/74 |
| 5,928,045 A | * | 7/1999 | Szabad | 441/74 |
| 6,368,172 B1 | * | 4/2002 | Travis | 441/65 |
| 6,394,864 B2 | * | 5/2002 | Scharl | 441/65 |
| 6,669,519 B2 | * | 12/2003 | Metrot | 441/65 |
| 6,736,689 B2 | * | 5/2004 | Renard et al. | 441/65 |
| 6,878,025 B2 | * | 4/2005 | Mead | 441/74 |
| 7,261,050 B2 | * | 8/2007 | Brauers et al. | 114/357 |
| 7,331,835 B2 | * | 2/2008 | Renard et al. | 441/74 |
| 7,404,749 B2 | * | 7/2008 | Cheung | 441/74 |
| 7,430,795 B2 | * | 10/2008 | Lin et al. | 29/603.12 |
| 7,507,133 B2 | * | 3/2009 | Cheung | 441/65 |
| 7,575,493 B2 | * | 8/2009 | Cheung | 441/74 |
| 7,845,999 B2 | * | 12/2010 | Conner, Jr. | 441/74 |
| 7,846,000 B2 | * | 12/2010 | Cox | 441/74 |
| 7,930,985 B2 | * | 4/2011 | Walworth et al. | 114/55.58 |
| 7,963,815 B2 | * | 6/2011 | Mead | 441/74 |
| D673,233 S | * | 12/2012 | Baggett | D21/769 |
| 8,460,042 B2 | * | 6/2013 | Conner, Jr. | 441/74 |

FOREIGN PATENT DOCUMENTS

| | | | | |
|---|---|---|---|---|
| CN | 2911080 Y | * | 6/2007 | E04F 15/02 |
| WO | WO 2009101217 A1 | * | 8/2009 | B32B 27/06 |

* cited by examiner

*Primary Examiner* — Daniel V Venne

(57) ABSTRACT

A watersports board is disclosed comprising: at least one non-cork layer; and at least one cork layer. Preferably, the watersports board further comprises a hollow core. More preferably, the watersports board comprises: a multiplicity of non-cork layers; and a multiplicity of cork layers; wherein said cork and non-cork layers are arranged alternately.

4 Claims, 3 Drawing Sheets

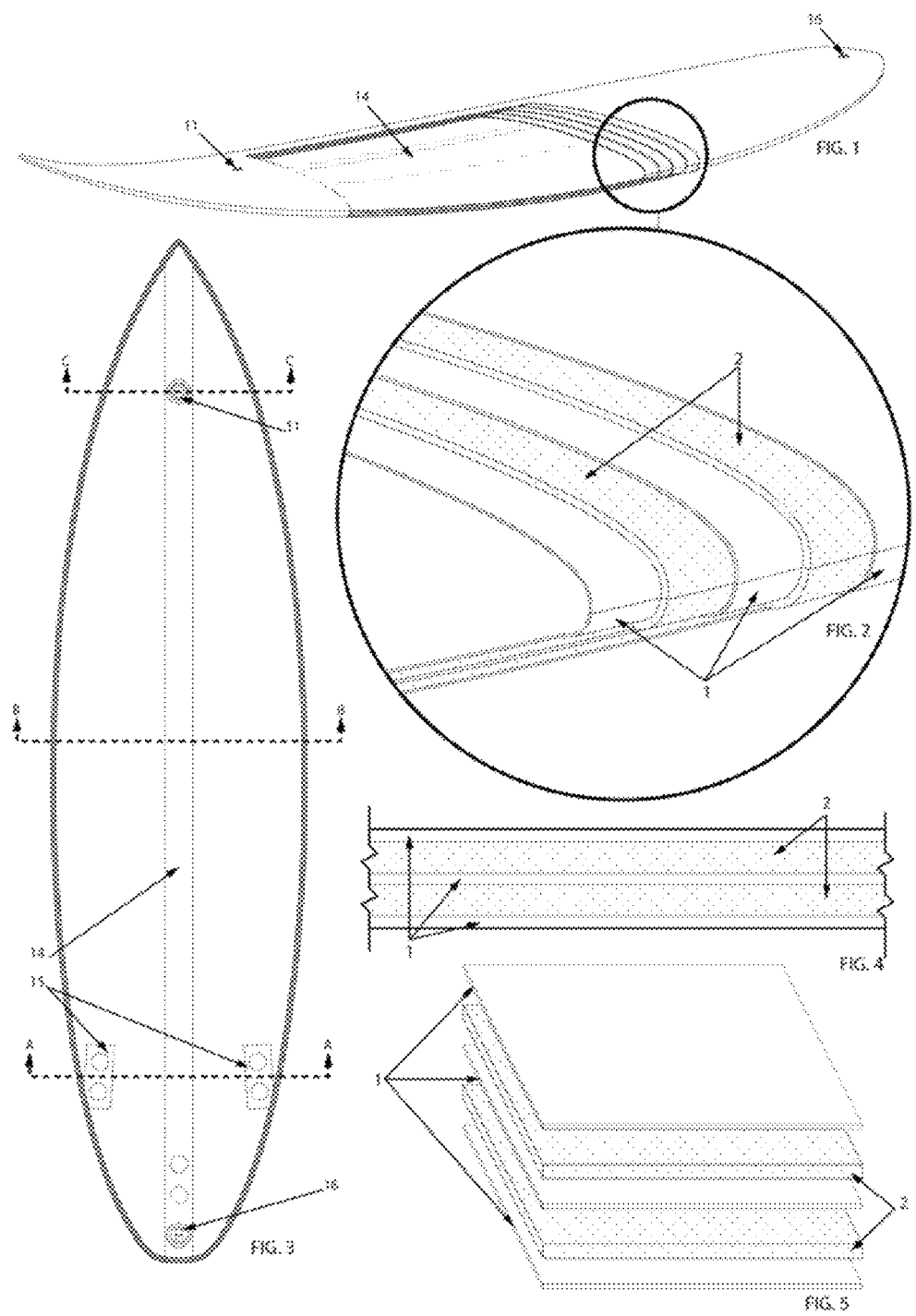

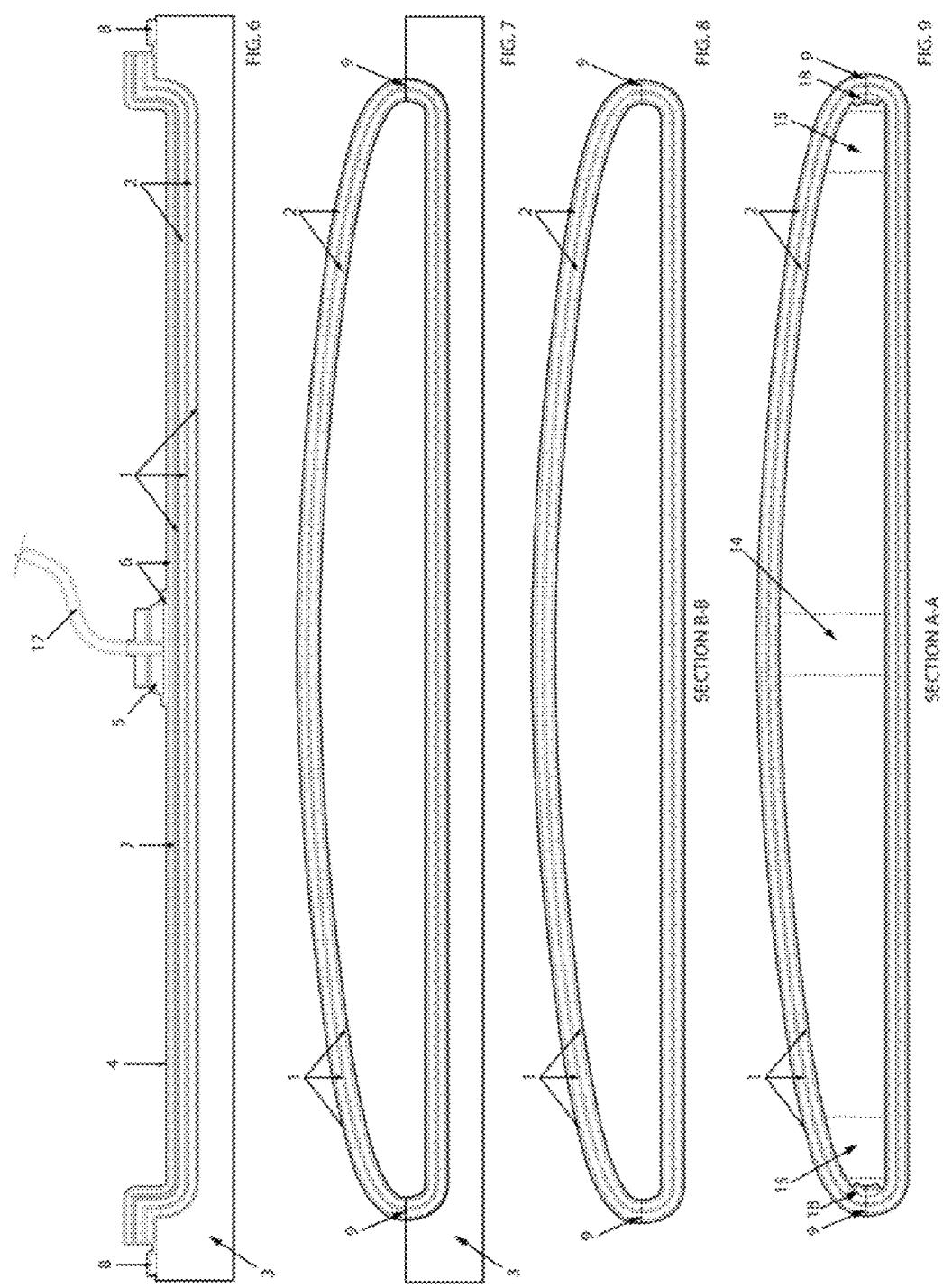

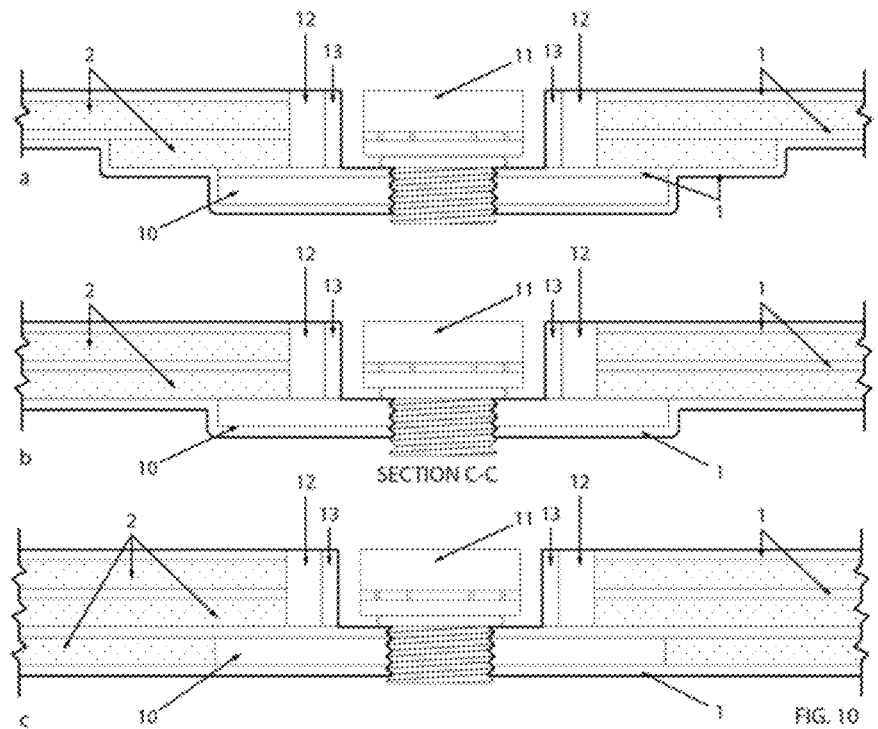
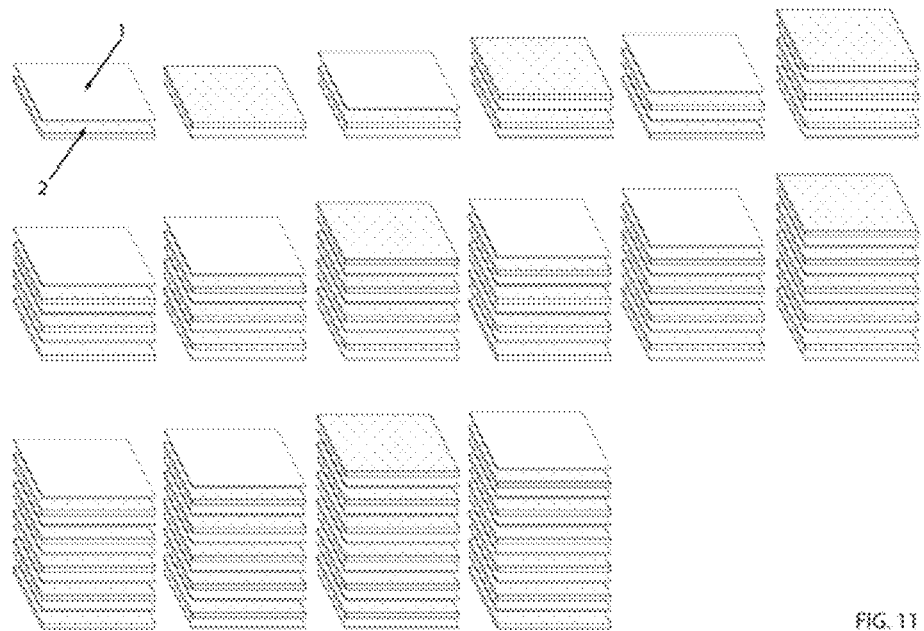

CORK WATERSPORTS BOARD

CROSS-REFERENCE TO RELATED APPLICATIONS

This application claims the benefit of provisional applications 61/593,167 filed Jan. 31, 2012, 61/593,351 filed Feb. 1, 2012, 61/593,839 filed Feb. 1, 2012, 61/595,033 filed Feb. 4, 2012.

BACKGROUND OF THE INVENTION

The present invention relates to watersports boards such as surfboards and the like, and in particular to lightweight watersports boards made from natural materials.

Lightweight watersports boards are known in the art. For example, US2004198112 to Renard discloses an aquatic gliding board which incorporates a subassembly that includes a hollow inner shell which is covered with a casing made of foam capable of being machined. The invention also relates to a hollow gliding board, such as a surfboard, that includes at least one longitudinal partition, such partition(s) connecting upper and lower portions of the subassembly. The partition(s) is (are) made of a foam, such as an elastic foam.

Watersports boards made from natural materials are known in the art. For example, US2009142975 to Zane discloses a biodegradable surfboard, the construction of which makes a minimal impact on the environment, composed of a pattern of wood veneers over a wooden framework, creating a hollow wooden body. All pieces used in construction are connected using food grade gelatin glue. Casein from skim milk added to the glue provides a general water-resistance to the structure. The whole is varnished with a waterproof combination of rosin and tung oil.

BRIEF SUMMARY OF THE INVENTION

It can be seen from the forgoing that a need has arisen for watersports boards which are both lightweight and made from natural materials, which retain the characteristics and performance of regular watersports boards.

It would be advantageous to provide watersports boards that were both lightweight and used natural materials in their construction, which performed as well as their equivalent standard watersports boards.

It is therefore an object of the present invention to provide lightweight watersports boards constructed using cork and having performance characteristics equal to their equivalent standard watersports boards.

To this end, a watersports board is disclosed comprising: at least one non-cork layer and at least one cork layer. Preferably, the watersports board further comprises a hollow core. More preferably, the watersports board comprises: a multiplicity of non-cork layers; and a multiplicity of cork layers; wherein said cork and non-cork layers are arranged alternately. A method of manufacturing such a board is also disclosed.

An advantage of the present invention is that the use of cork makes the board very strong, buoyant, and durable, all of which features are requirements for a watersports board. A further advantage is that the use of a substantially hollow core in conjunction with cork makes the board lightweight. A still further advantage is that use of cork enables the board to be made flexible, which flexibility can be customised by altering the cork composite laminate. A yet further advantage is that the board performs and manoeuvres like a conventional watersports board. An environmental advantage of using cork is that it is a more sustainable material than any other type of wood; it is highly environmentally friendly. A further environmental advantage is that the amount of foam required to produce the board is far reduced. A yet further environmental advantage is that all cork waste from the production process can be recycled. A still further advantage is that the production process is highly energy efficient.

BRIEF DESCRIPTION OF THE SEVERAL VIEWS OF THE DRAWING

The invention can be better understood with reference to the following drawings, in which:

FIG. 1 is a perspective view showing the top of the surfboard of the present invention;

FIG. 2 is a magnified view of the cork composite laminate of the present invention;

FIG. 3 is a top plan longitudinal view of a hollow cork surfboard of the present invention;

FIG. 4 is a cross sectional schematic view of the cork composite laminate for forming a deck part or bottom part of a hollow cork surfboard of the present invention;

FIG. 5 is an exploded schematic view of stacked sheets of resin impregnated material used to form a cork composite laminate;

FIG. 6 is a cross sectional schematic view of the cork composite laminate placed in a mold for preparation of a molded surfboard deck or bottom;

FIG. 7 is a cross sectional schematic view of the molded cork composite laminate deck and bottom in a mold being glued together to form a hollow cork surfboard;

FIG. 8 is a cross sectional schematic view of a hollow cork surfboard taken along line B-B of FIG. 3;

FIG. 9 is a cross sectional schematic view taken along line A-A of FIG. 3 which illustrates a hollow cork surfboard with stringer and other optional components;

FIG. 10 is a partial cross sectional schematic view taken along line C-C of FIG. 3 which illustrates the breather plug installation; and FIG. 11 illustrates examples of different material layering arrangements to produce alternative cork composite laminates.

DETAILED DESCRIPTION OF THE INVENTION

In a preferred embodiment of the invention, shown in FIGS. 1-11 wherein like numerals refer to like components, a watersports board is disclosed comprising: at least one non-cork layer; and at least one cork layer. Preferably, the watersports board further comprises a hollow core. More preferably, the watersports board comprises: a multiplicity of non-cork layers; and a multiplicity of cork layers; wherein said cork and non-cork layers are arranged alternately. In the most preferred embodiment, the watersports board comprises: three non-cork layers; and two cork layers arranged alternately around a hollow core such that a non-cork layer is closest to the core, followed by a cork layer, followed by a non-cork layer, followed by a cork layer, followed by an outer non-cork layer. An advantage of this arrangement is that it provides a high level of durability to the watersports board while maintaining a light weight. The arrangement of the layers in this way or in any way to form layers of cork and non-cork will hereinafter be referred to as the cork composite laminate.

The invention will now be described with reference to the accompanying drawings.

FIG. 1 is a perspective view showing the top or deck part of the watersports board of the present invention. The bottom part of the watersports board comprises that part which cannot be seen in FIG. 1. (The bottom part can be understood as the part to the right of glue line 9 in FIG. 8, while the deck part is that to the left of glue line 9.) The watersports board may be shaped as shown in the figure, or alternatively may be shaped as any type of watersports board or water riding equipment known in the art, for example but without limitation, a surfboard, standup paddleboard, windsurf board, or kitesurf board.

The cork layers may be of any thickness but are most preferably of the order of 2 millimeters.

The cutaway section shows the layers of cork and non-cork which are labeled in FIG. 2. On the surface of the board are shown an optional breather plug 11 and optional leash plug 16, which may be any leash plug as known in the art for watersports boards. In the cutaway area optional stringer 14 is shown.

FIG. 2 is a magnified view of the cork composite laminate showing layers of cork 2 and layers of non-cork 1.

The cork is preferably agglomerated cork composite, although other types of cork may also be used. Preferably the cork layers are constructed from agglomerated cork composite sheets, although pre-molded agglomerated cork shell may also be used. This can be made uniformly by pressing resin coated agglomerated cork granules into a deck or bottom mold to form a shell of the desired thickness. After curing this shell is removed from the mold and can be integrated into the production process.

Some technical advantages of using cork include the following: Cork composite is very strong, buoyant, and durable, all of which features are requirements for a watersports board. The resulting board is hollow and lightweight. The board can be made flexible, which flexibility can be customised by altering the cork composite laminate. The use of cork provides a board which performs and manoeuvres like a conventional watersports board.

Furthermore, environmental advantages of using cork include the following: Cork as a material is more sustainable than any other type of wood. It is highly environmentally friendly. The amount of foam required to produce the board is far reduced. All cork waste from the production process can be recycled. The production process is highly energy efficient.

The non-cork layer or layers may comprise carbon fibre, glass fibre, synthetic resin fibre for example but without limitation Kevlar, natural fibres for example but without limitation hemp, coconut, bamboo, or any combination of the above, or any other material known in the art.

FIG. 3 is a top plan longitudinal view of a hollow cork watersports board of the present invention in the form of a surfboard showing the stringer 14, breather plug 11 and leash plug 16, as well as optional fin boxes 15.

Alternatively the present invention may be in the form of a standup paddle board having the stringer 14, breather plug 11 and leash plug 16, as well as optional fin boxes 15 as known in the art. A carry handle as known in the art may also be included. The fin boxes and carry handle may be disposed anywhere on the board. Furthermore a deck pad as known in the art may be installed anywhere on the board.

As a further alternative, the present invention may be in the form of a windsurf board having the stringer 14, fin boxes 15 and breather plug 11 shown in FIG. 3, as well as a dagger board cassette, foot straps, foot strap reinforcements and mast track. The dagger board cassette, foot straps, foot strap reinforcements and mast track are all optional components and may be any such components as known in the art and may be disposed anywhere on the board. Optionally, a deck pad may also be installed anywhere on the board.

As a yet further alternative, the present invention may be in the form of a kitesurf board having the stringer 14, fin boxes 15, breather plug 11 and leash plug 16 of FIG. 3, as well as optional foot strap, foot pads and/or binding, and a handle. These optional components may be any such components known in the art and may likewise be positioned anywhere on the board as known in the art.

Paragraphs 33-35 describe various different embodiments of the present invention in different types and shapes of watersports boards, and it will be appreciated that these are merely examples and that many other types of board having design variations for different users and for different watersports may be envisaged within the scope of the invention, and of which may have a variety of different configurations of straps, handles, internal supports and other features. FIG. 3 is an illustration of a typical arrangement, but many other optional arrangements exist within the scope of the invention.

FIGS. 4 and 5 are a cross sectional schematic view and an exploded schematic view respectively of the cork composite laminate for forming a deck part or a bottom part of a watersports board showing non-cork layers 1 and cork layers 2. The layers of FIG. 5 are preferably impregnated with resin as known in the art before being stacked together to form the composite laminate of FIG. 4.

A method of forming a watersports board is disclosed herein, which will be described in reference to the accompanying drawings.

FIG. 6 shows the mold and vacuuming equipment used in the manufacturing process for the board of the present invention. The figure shows a cross sectional schematic view of the composite laminate placed in a mold 3 for preparation of a molded surfboard bottom. A separate mold is used to prepare the deck part.

FIG. 7 is a cross sectional schematic view showing the two molded cork composite laminate parts (the deck part to the left of glue line 9 and the bottom part to the right of glue line 9) being glued together to form a hollow cork surfboard. The gluing preferably takes place with at least one part still in the mold and may take place with neither part or both parts in the mold.

The preferred method of forming a watersports board, illustrated by FIGS. 6 and 7, comprises the steps of:
  providing a deck mold (not shown) and a bottom mold 3 for forming a watersports board;
  pre-cutting at least one cork layer and at least one non-cork layer to a size appropriate for said watersports board;
  placing said layers into said mold as shown in FIG. 6, in the desired arrangement (which may, for example but without limitation be any of the arrangements shown in FIG. 11, or may be any other arrangement comprising at least one cork layer and at least one non-cork layer);
  impregnating said layers with a resin 12;
  shaping said layers into said molds;
  trimming the layers to size as known in the art to form a deck piece and a bottom piece; and
  gluing together the deck and bottom pieces along glue line 9 using any suitable glue known in the art.

Any means known in the art may be used to shape the layers into the molds. However, the preferred method which is illustrated in the figures is as follows:
  positioning peel ply 7, breather fabric 6 and a vacuum breach unit 5 on said layers;
  sealing a vacuum bag 4 around said molds, which may comprise a vacuum bag film sealed around its edges with mastic sealant tape 8 to form an airtight seal between the film and the mold as shown in the figure, or may alternatively comprise a vacuum bag into which the entire mold is placed, which is then sealed to form an airtight envelope;

connecting a vacuum line 17 to the vacuum breach unit; drawing air out of the bag;

applying pressure to the layers in the molds by any means known in the art;

allowing to cure for an appropriate amount of time as known in the art; and removing the vacuum bag, breather fabric and peel ply.

This is the preferred means of shaping the layers into the molds, but other techniques known in the art may be used as described below.

After removal of the vacuum bag, or at any stage, the method may further comprise gluing into place at least one selected from the list comprising: stringer, fin box, edge reinforcement, or other internal support structure. These internal support components may comprise cork, foam, or any other materials as known in the art, and are shaped and formed as known in the art. If present, they may be in any location on the board and may be any size. Furthermore, in place of an internal fin box as shown in the figures, external fins may be glassed on to the board as known in the art, or fin inserts may be used as known in the art.

Still further, external components may be installed such as carry handles (in particular in the case of standup paddleboards), foot straps, inserts for foot straps, foot pads, and/or binding (in particular in the case of windsurf and kitesurf boards), dagger board cassettes, foot strap reinforcements, and/or mast tracks (in particular for windsurf boards) and deck pads, or any other component for these or any other type of watersports board. These may be any such components as known in the art, and may be installed anywhere on the board as known in the art.

Still further, the board may be entirely hollow, or may be entirely solid, being completely filled with such reinforcements of any material, or of cork composite laminate as disclosed herein. For example the board may have a solid foam core or a hollowed foam core.

Furthermore, at any stage in the manufacturing process, the process may include installing at least one of a leash plug and a breather plug, as known in the art, which may be any such components known in the art and may be disposed in any location on the board.

The deck mold and bottom mold are as known in the art and commonly used to make surfboards and other watersports boards, and mold release agent as known in the art may be applied on the surfaces of the molds before placing the composite laminate layers on to the mold. Alternatively the mold can be covered with thin plastic film as known in the art prior to placing the layers on the mold.

The resin is preferably epoxy resin since this has a degree of flexibility suitable for use with cork, although other types of resin known in the art may be used.

The peel ply, breather fabric, vacuum breach unit, vacuum bag film, vacuum line and mastic sealant tape are all commonly known components as known in the art and used for the vacuum bagging process as described herein. Furthermore, any mold and vacuum bagging process or technique known in the art may be used to shape and form the deck and bottom parts, and still further, any suitable process may be used to shape and form the deck and bottom parts. Still further, any process may be used to finish the parts and to attach them together.

The finished watersports board is shown in FIGS. 8 and 9.

FIG. 8 is a cross sectional schematic view of a hollow cork watersports board taken along line B-B of FIG. 3. FIG. 8 shows the bottom part as the part to the right of glue line 9 and the deck part to the left of glue line 9.

FIG. 9 is a cross sectional schematic view taken along line A-A of FIG. 3 which illustrates a hollow cork surfboard with some examples of optional components, that is, a stringer 14, fin boxes 15, and edge reinforcement 18, all of which may comprise any of the materials aforementioned herein.

FIGS. 10a, 10b, and 10c illustrate the breather plug installation and show a partial cross sectional schematic view taken along line C-C of FIG. 3. It should be noted that the breather plug may be disposed in any location on the board and is shown here along line C-C for example only.

In FIG. 10a the breather plug installation is shown within a single cork layer laminate. Plastic sheet 10 and PVC conduit 13 (attached by resin 12) surround breather plug 11 to form the breather plug installation, all components being as known in the art for watersports boards.

In FIG. 10b, the breather plug installation is shown within a two cork layer laminate. Plastic sheet 10 and PVC conduit 13 (attached by resin 12) surround breather plug 11 to form the breather plug installation, all components being as known in the art for watersports boards.

In FIG. 10c, the breather plug installation is shown within a three or more cork layer laminate. Plastic sheet 10 and PVC conduit 13 (attached by resin 12) surround breather plug 11 to form the breather plug installation, all components being as known in the art for watersports boards.

FIG. 11 illustrates different material layering arrangements to produce alternative cork composite laminates, wherein cork layers 2 and non-cork layers 1 as hereinbefore defined are shown arranged in a variety of ways. It should be noted that these are for example only and are not intended to be limiting.

The invention claimed is:

1. A method of forming a watersports board comprising the steps of:
    providing a deck mold and a bottom mold for forming a watersports board;
    pre-cutting at least one cork layer and at least one non-cork layer;
    placing said at least one cork layer and at least one non-cork layer into said deck mold and said bottom mold;
    impregnating said at least one cork layer and at least one non-cork layer with a resin;
    shaping said at least one cork layer and at least one non-cork layer into said deck mold and said bottom mold;
    trimming the at least one cork layer and at least one non-cork layer to form a deck piece and a bottom piece; and
    gluing together the deck piece and bottom piece.

2. A method of forming a watersports board comprising the steps of:
    providing a deck mold and a bottom mold for forming a watersports board;
    pre-cutting at least one cork layer and at least one non-cork layer;
    placing said at least one cork layer and at least one non-cork layer into said deck mold and said bottom mold;
    impregnating said at least one cork layer and at least one non-cork layer with a resin;
    positioning peel ply, breather fabric and a vacuum breach unit on said at least one cork layer and at least one non-cork layer;
    sealing a vacuum bag around said deck mold and said bottom mold;
    connecting a vacuum line to the vacuum breach unit;

drawing air out of the vacuum bag;
applying pressure to the at least one cork layer and at least one non-cork layer in said deck mold and said bottom mold;
allowing to cure;
removing the vacuum bag, breather fabric and peel ply;
trimming the at least one cork layer and at least one non-cork layer to form a deck piece and a bottom piece; and gluing together the deck piece and bottom piece.

3. The method of claim 1 or claim 2 further comprising at least one of the steps of:
attaching at least one selected from the list comprising: stringer, fin box, internal support structure; after removing the vacuum bag.

4. The method of claim 1 or claim 2 further comprising:
attaching at least one of a leash plug and a breather plug.

* * * * *